H. E. SESSIONS.
COTTON SEED LINTER.
APPLICATION FILED DEC. 15, 1914.
1,231,951.
Patented July 3, 1917.
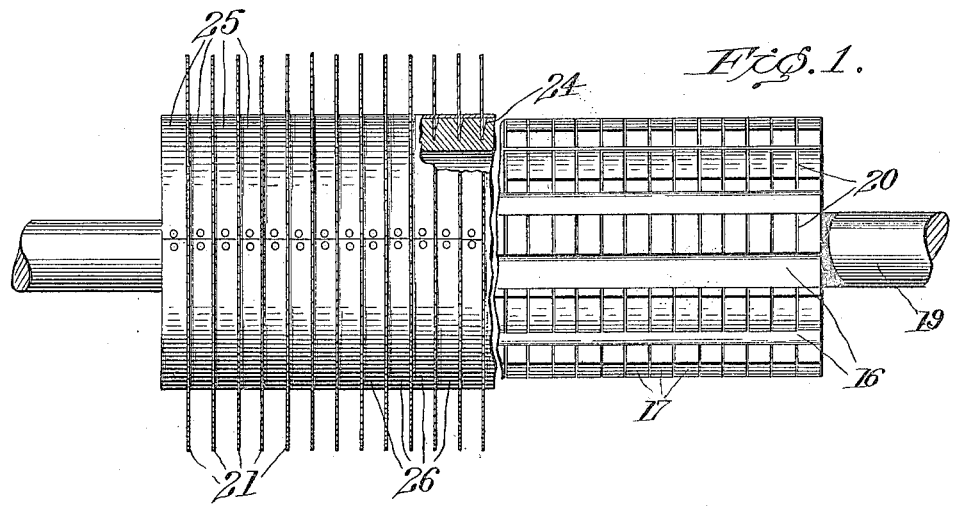
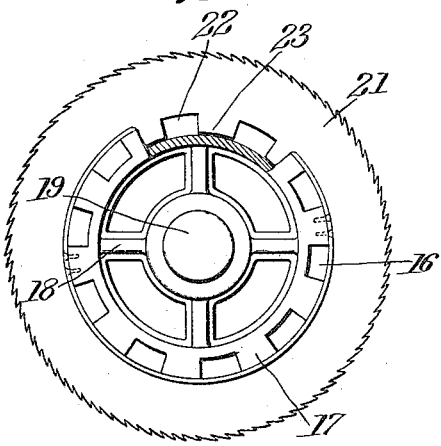
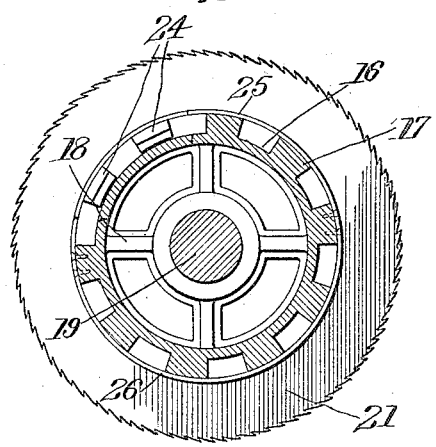
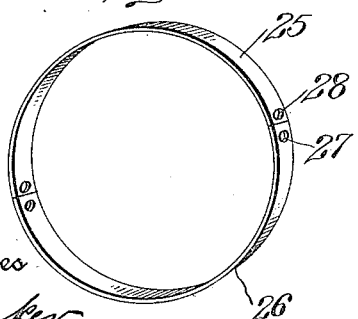
Witnesses
G. H. Baker
H. P. Jennings
Inventor
Hugh E. Sessions
By Foster, Freeman, Watson & Coit
Attorneys

UNITED STATES PATENT OFFICE.

HUGH E. SESSIONS, OF COLUMBIA, SOUTH CAROLINA.

COTTON-SEED LINTER.

1,231,951.

Specification of Letters Patent. Patented July 3, 1917.

Application filed December 15, 1914. Serial No. 877,443.

*To all whom it may concern:*

Be it known that I, HUGH E. SESSIONS, a citizen of the United States of America, and resident of Columbia, Richland county, State of South Carolina, have invented certain new and useful Improvements in Cotton-Seed Linters, of which the following is a specification.

This invention has reference to the saw cylinder used in removing lint from cotton seed and has particular reference to such a cylinder used in what is known as a linter. A well known type of saw cylinder used in linters embodies a saw cylinder provided with longitudinal ribs which are cut across at intervals to receive the saws, the saws being placed in position from one end of the cylinder and being rigidly secured in place. The ribs leave projections between the saws and in the rapid rotation of the saw cylinder these projections cause an air draft or current which takes some of the lint from the periphery of the saw and it collects on the cylinder between the ribs. After a certain amount has collected, it will fall, and ordinarily will be lost going off with the motes and trash. The present invention is intended to prevent this loss of the lint and to prevent largely the draft caused by the saw cylinder. The novel features of the invention will be apparent from the following description, taken in connection with the drawings.

In the drawings,

Figure 1 is a front view partly in section and partly broken away of a saw cylinder embodying my invention;

Fig. 2 is an end view of the saw cylinder partly in section immediately adjacent one side of a saw;

Fig. 3 is a sectional view of the saw cylinder taken between two adjacent saws, but showing a portion in section immediately beside one of the saws;

Fig. 4 is a detail perspective view of one form of ring used between the saws; and Fig. 5 is a similar view of a modified form of ring which is adapted to be sprung into place over the cylinder.

The saw cylinder 16 is formed with integral longitudinal ribs 17 on its outer surface and is preferably made hollow to reduce its weight, being connected by arms 18 to a central operating shaft 19. The ribs 17 are provided with slots 20, the slots on one rib being in line with the slots on the next rib, so as to form practically a slot around the periphery of the cylinder in the ribs. The circular saws 21 are made with a central opening to fit over the cylinder 16 and notches 22 are cut in the inner edge of the saws so as to fit over the ribs 17. Each saw is placed on the cylinder at one end and is moved down to the particular cross slot where it is to be secured and it is then turned so that the notch 22 is in the space between the ribs, and the projection 23 is in the slot in the rib. Wedges 24 are driven in beside the saw into the slot 20 so as to rigidly and firmly hold the saw in place. In this construction the ribs form outwardly extending projections between the saws and on the rapid rotation of the saw cylinder create a suction or draft which tends to draw particles of lint from the periphery of the saw, where the teeth are in toward the center and this lint collects in the spaces or pockets between the ribs. When enough lint has collected to form a heavy enough mass to fall by its own weight, it will be discharged downwardly from the saw cylinder and will ordinarily go off with the motes and trash and be lost. According to my present invention, I place between the saws a series of rings fitting close against the outer edges of the ribs 17 and entirely filling the space between each saw and the next saw so as to make a smooth surface which will not catch the air and cause a suction or draft. These rings may be made of metal or any other suitable material and may be secured in place in any suitable way. In Fig. 4 I have shown the ring made up of two semi-circular sections 25 and 26 which may be placed around the cylinder and which may be secured by screws or other fastening means passing through the openings 27, 28. I prefer however to make the ring in the form shown in Fig. 5 where it is made in one piece 29 cut at 30, and adapted to be sprung over the cylinder between the saws. It may be held in place by its own resiliency or suitable fastening means may be used to hold it. It will be observed that when the series of rings are in place as shown in Fig. 1, the saw cylinder presents a smooth cylindrical outer surface between the saws, and this avoids the objections above indicated to the cylinder with the longitudinal ribs. It will be further observed that the rings as above indicated can be applied to saw cylinders which are already in existence of the type above indicated.

Having thus described my invention, what I claim is:

In a device of the class described, the combination with a saw cylinder, having integral spaced longitudinal ribs on its outer surface provided with cross cuts, of a series of saws mounted on said cylinder at intervals in said cross cuts, and a series of split rings sprung over said cylinder between said saws and forming a smooth outer surface for said cylinder.

In testimony whereof I affix my signature in presence of two witnesses.

HUGH E. SESSIONS.

Witnesses:
JOHN M. COIT,
ARTHUR L. BRYANT.

Copies of this patent may be obtained for five cents each, by addressing the "Commissioner of Patents, Washington, D. C."